US006701217B1

(12) United States Patent
Sansone

(10) Patent No.: US 6,701,217 B1
(45) Date of Patent: Mar. 2, 2004

(54) DUAL METERING METHOD FOR INDICATING THE CONTENTS OF MAIL

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/256,434

(22) Filed: Sep. 27, 2002

(51) Int. Cl.[7] .................................................. G06F 7/00

(52) U.S. Cl. ......................... 700/227; 700/90; 700/115; 700/226; 700/224

(58) Field of Search ........................... 700/90, 115, 226, 700/227, 224; 705/28; 235/380, 487, 492

(56) References Cited

U.S. PATENT DOCUMENTS

| | | | | |
|---|---|---|---|---|
| 5,043,908 A | | 8/1991 | Manduley et al. | 364/478 |
| 5,497,140 A | * | 3/1996 | Tuttle | 340/10.1 |
| 5,971,587 A | * | 10/1999 | Kato et al. | 700/230 |
| 5,978,781 A | | 11/1999 | Sansone | 705/408 |
| 6,188,996 B1 | | 2/2001 | Sansone | 705/408 |
| 6,208,910 B1 | | 3/2001 | Critelli et al. | 700/225 |
| 6,211,781 B1 | | 4/2001 | McDonald | 340/505 |
| 6,249,227 B1 | | 6/2001 | Brady et al. | 340/572.1 |
| 6,259,367 B1 | * | 7/2001 | Klein | 235/375 |
| 6,259,369 B1 | * | 7/2001 | Monico | 340/572.8 |
| 6,275,745 B1 | | 8/2001 | Critelli et al. | 700/227 |
| 6,529,446 B1 | * | 3/2003 | de la Huerga | 368/10 |

* cited by examiner

*Primary Examiner*—Gene O. Crawford
(74) *Attorney, Agent, or Firm*—Ronald Reichman; Angelo N. Chaclas

(57) ABSTRACT

A method that enables the USPS to be aware of the contents of mail and the identity of the party who licensed the postal meter that paid for the mailing. The foregoing is accomplished by placing human readable postal meter indicia on the mail that contains information that uniquely identifies the mail and the licensee of the meter in addition to incorporating a radio frequency identification tag on the mail that identifies the contents of the mail and the information that uniquely identifies the mail. Additional security will be obtained by knowing the identity of the mailer and the contents of the mailing. The radio frequency tags may be remotely read, enabling the USPS to be aware of the contents of the mail permitting different content mail to be handled differently.

17 Claims, 6 Drawing Sheets

FIG.6

990

| COLT GOVERNMENT MODEL .45 Parts List | | |
|---|---|---|
| Drawing Number | Description | Part Number |
| 1 | Barrel | 50142 |
| 2 | Barrel Bushing | 50145 |
| 3 | Barrel Link | 50143 |
| 4 | Barrel Link Pin | 50144 |
| 5 | Dis-connector | 50147 |
| 6 | Ejector | 50169 |
| 7 | Ejector Pin | 50170 |
| 8 | Extractor | 50184 |
| 9 | Firing Pin | 50185 |
| 10 | Firing Pin Spring | 50186 |
| 11 | Firing Pin Stop | 50219 |
| 12 | Front Sight—1/10" | 50189 |
| 13 | Grip Safety | 53821 |
| 14 | Hammer | 50150 |
| 15 | Hammer Pin | 50153 |
| 16 | Hammer Strut | 50151 |
| 17 | Hammer Strut Pin | 50152 |
| 18 | Magazine Assembly | 50198 |
| 19 | Magazine Catch | 50155 |
| 20 | Magazine Catch Lock | 50007 |
| 21 | Magazine Catch Spring | 50156 |
| 22 | Magazine Follower | 50199 |
| 23 | Magazine Spring | 50200 |
| 24 | Main Spring | 50158 |
| 25 | Main Spring Cap | 50159 |
| 26 | Main Spring Cap Pin | 50160 |
| 27 | Main Spring Housing | 50161 |
| 28 | Main Spring Housing Pin | 50163 |
| 29 | Main Spring Housing Pin Retainer | 50162 |
| 30 | Recoil Spring Plug | 50206 |
| 31 | Plunger Spring | 50165 |
| 32 | Plunger Tube | 50171 |
| 33 | Rear Sight—1/10" | 50190 |
| 34 | Receiver | 50001 |
| 35 | Recoil Spring | 50204 |
| 36 | Recoil Spring Guide | 50205 |
| 37 | Safety Lock | 50174 |
| 38 | Safety Lock Plunger | 50166 |
| 39 | Sear | 50177 |
| 40 | Sear Pin | 50178 |
| 41 | Sear Spring | 50179 |
| 42 | Slide | 50188 |
| 43 | Slide Stop | 50195 |
| 44 | Slide Stop Plunger | 50167 |
| 45 | Stock—Left Hand Plastic | 50207 |
| 46 | Stock—Right Hand Plastic | 50208 |
| 47 | Stock Screw—(4) | 50209 |
| 48 | Stock Screw Bushing—(4) | 50173 |
| 49 | Trigger Assembly | 50180 |

DUAL METERING METHOD FOR INDICATING THE CONTENTS OF MAIL

FIELD OF THE INVENTION

The invention relates generally to the field of mailing systems and, more particularly, to systems for indicating the contents of mail.

BACKGROUND OF THE INVENTION

Governments have created postal services for collecting, sorting and distributing the mail. The United States Postal Service (USPS) typically charges mailers for delivering the mail. Mailers may pay the USPS for its service by purchasing a stamp, i.e., a printed adhesive label or tape, issued by the postal service at specified prices, that is affixed to all letters, parcels or other mail matter to show prepayment of postage. Another means of payment accepted by the USPS its metered by a postage meter. Postage meters are approved by the USPS and licensed to the meter user by the meter manufacturer. A postage meter is an electromechanical device that maintains, through "electronic registers" or "postal security devices," an account of all postage printed, and the remaining balance of prepaid postage; and prints postage postmarks (indicia) or provides postage postmarks (indicia) information to a printer, that are printed and accepted by the USPS as evidence of the prepayment of postage.

The USPS currently handles large volumes of normal mail, i.e., first class mail, second class mail, third class mail, etc. The USPS also handles large quantities of special service mail, i.e., priority mail, certified mail, registered mail, etc. For all of the above types of mail the physical contents of the mailing is not written on the face of the mail.

Currently the USPS does not charge the mailer additional fees for the mailing of goods that may have special treatment requirements, i.e., mail that needs to be refrigerated and/or mail that has certain pressure requirements. Examples of mail that may require special treatment requirements are radioactive materials; chemical compounds; poisons; carcinogenic materials; caustic chemicals; drugs; biological materials; thermo-sensitive materials; etc.

Many different categories of goods are ordered and delivered via the USPS. Oftentimes, it is legal for a purchaser to buy certain categories of goods and illegal for the purchaser to buy other categories of goods. For instance, each of the components of a submachine may be legally purchased by an ordinary citizen without a license, while the complete submachine gun may not be legally purchased by an ordinary citizen without a license. Heretofore, the USPS was unable to determine when people were purchasing goods from one shipper that may be combined with other goods that were purchased from different shippers to produce illegal goods.

Soon after the Sep. 11,2001, terrorist attack on the United States, someone and/or a group of people has been adding harmful biological agents to the mail. The addition of harmful biological agents to the mail submitted to the USPS has caused the death of some people and necessitated the closure of some postal services, other government office buildings, and some businesses. Thus, there is an urgent need for the USPS to be aware of the contents of mail.

SUMMARY OF THE INVENTION

This invention overcomes the disadvantages of the prior art by utilizing a method that enables the USPS to be aware of the contents of mail and the identity of the party who licensed the postal meter that paid for the mailing. The foregoing is accomplished by placing human-readable postal meter indicia on the mail that contains information that uniquely identifies the mail and the licensee of the meter in addition to incorporating a radio frequency identification tag on the mail that identifies the contents of the mail and the information that uniquely identifies the mail. Additional security will be obtained by knowing the identity of the mailer and the contents of the mailing. The radio frequency tags may be remotely read, enabling the USPS to be aware of the contents of the mail permitting different content mail to be handled differently.

An additional advantage of this invention is that the USPS may be able to determine when individuals are purchasing goods from one shipper that are combined with other goods that were purchased from a different shipper to produce illegal goods. The USPS may accomplish the foregoing by keeping track of the categories of goods that are sent to individuals or groups of individuals and determining if a suspicious pattern is present that requires further investigation. For instance, a pattern of purchasing certain types of goods or of goods that have dual usage may indicate that an investigation is in order.

BRIEF DESCRIPTION OF THE DRAWINGS

FIG. 6 is a database of the components of a 45-caliber colt government model pistol.

DETAILED DESCRIPTION OF THE PREFERRED EMBODIMENT

Figure 1:
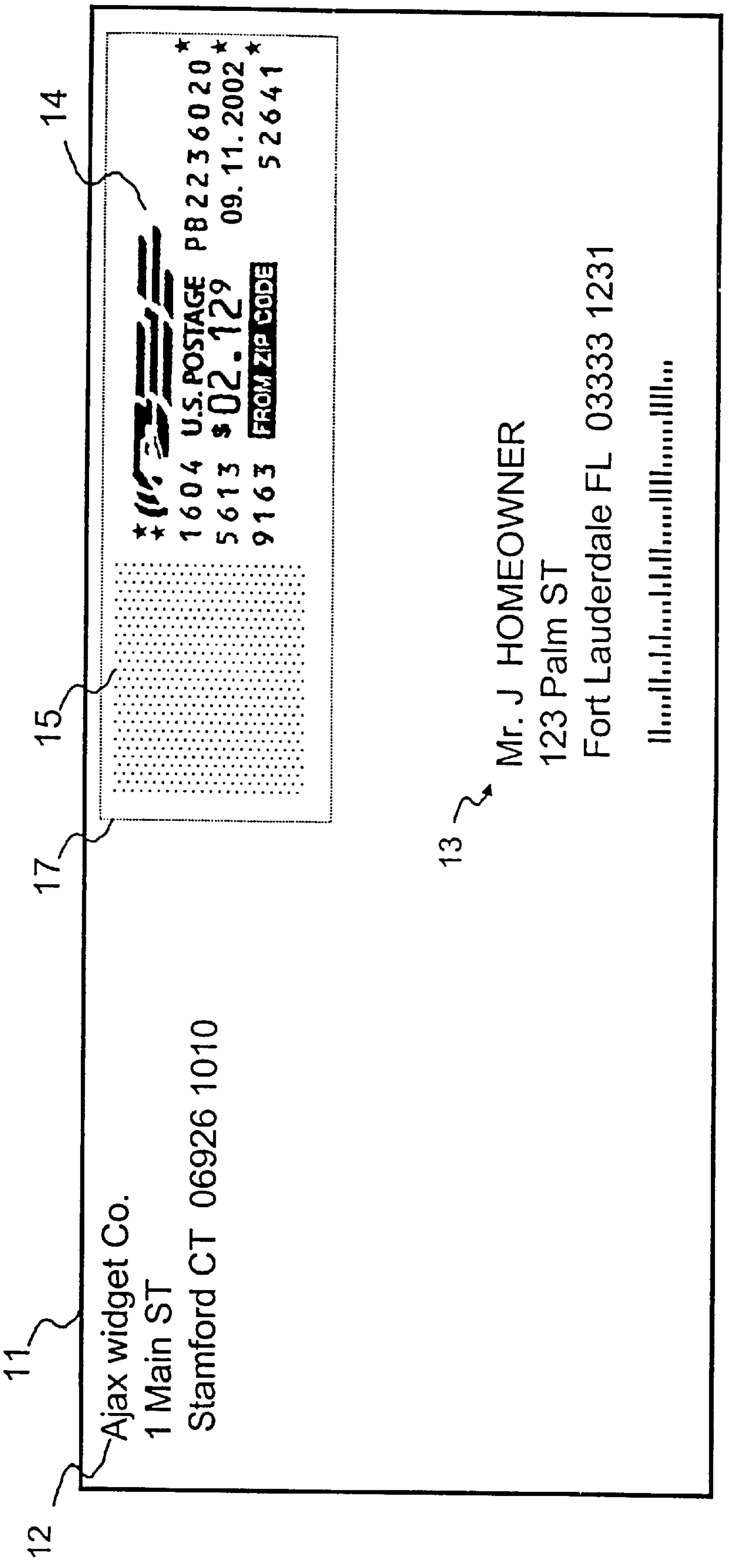
FIG. 1 is a drawing of a mail piece having a label with a postal meter indicia printed on the label and a radio frequency identification tag device embedded in the label that is affixed to the mail piece.

Referring now to the drawings in detail and more particularly to FIG. 1, the reference character 11 represents mail, i.e., a mail piece or a package that has a sender address field 12, a recipient address field 13, a postal indicia 14, and a radio frequency identification tag 15 that contains specified information. Postal indicia 14 may be a permit indicia, information-based indicia, printed indicia, penalty indicia, etc. Radio frequency identification (RFID) tag 15 may be the 4×6 RFID Smart Label Philips manufactured by RAFEC USA of 999 Oakmont Plaza Drive, Suite 200, Westmont, Ill. 60559. The information contained in tag 15 is the sender address field 12, recipient address field 13, type of special service to be performed by the carrier, i.e., priority mail, certified mail, registered mail, express mail, etc., and the category of the goods contained in mail 11. The expected recipient's delivery time may also be written into tag 15. Indicia 14 and tag 15 may be placed on a label 17 that is adhered to mail 11.

Figure 2:
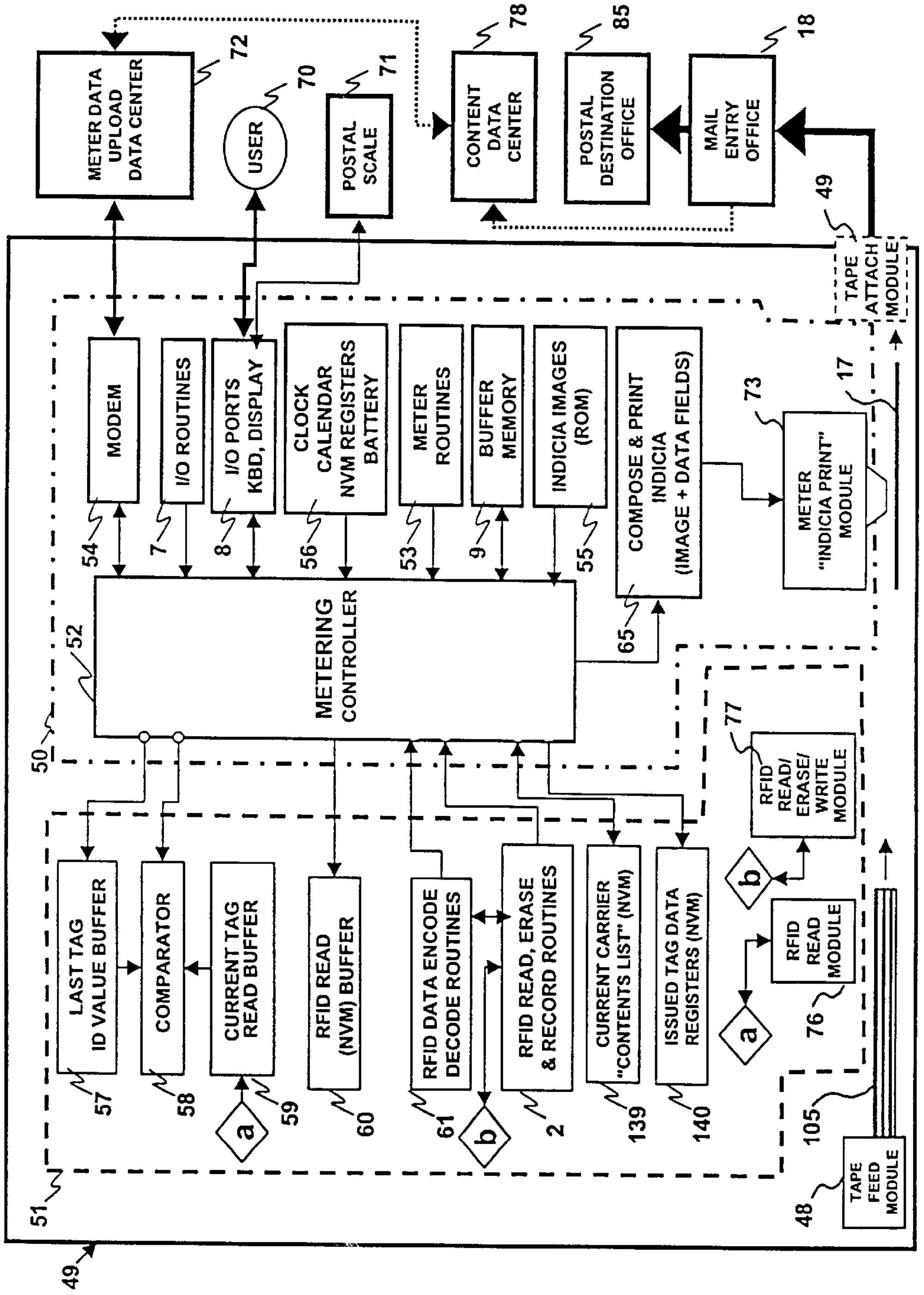
FIG. 2 is a block diagram of a dual meter that contains a electronic postage meter and a radio frequency identification reader/writer.

FIG. 2 is a block diagram of a dual meter 49 that contains electronic postage meter 50, a radio frequency identification reader/writer 51, tape feed module 48 and a tape attach module 49. Postage meter 50 may be the B700 Post Perfect postage meter manufactured by Pitney Bowes Inc. of Stamford, Conn.

Metering controller 52 functions as a meter controller for postage meter 50 and a controller for radio frequency identification reader/writer 51. Controller 52 is coupled to last tag buffer 57, comparator 58, current read tag buffer 59, radio frequency identification read non-volatile memory buffer 60, radio frequency identification encode/decode routines 61, radio frequency identificationread, erase and record routine 2, current carrier contents list non-volatile memory 139, and issued tag data registers non-volatile memory 140. Comparator 58 is coupled to last tag identification buffer 57 and current tag read buffer 59. Buffer 59 is coupled to radio frequency identification read module 76, and radio frequency identification encode/decode routines 61 is coupled to radio frequency identification read/erase/record module 77.

Electronic meter 50 includes meter routines 53, modem 54, indicia image routines 55, clock calendar non-volatile memory registers and battery 56, I/O routines 7, I/O ports keyboard and display 8, buffer memory 9 and compose and print indicia image and data fields 65. Controller 52 is coupled to modem 54, I/O routines 7, miter routines 53, I/O port keyboard and display 8. Compose and print indicia 65 is coupled to meter indicia print module 73.

Meter 50 begins to function when a user 70 sets the postage dollar amount by weighing mail 11 on scale 71 and enters the type of service and category of the goods contained in mail 11 into I/O ports, keyboard and display 8 of meter 50. The weight and amount of postage for mail 11 is displayed by display 8. Controller 52 will compose an image of indicia 11 (FIG. 1) using the fixed graphic indicia images from indicia images ROM 55 and compose and print indicia images and data field 65. The above image will be stored in buffer memory 49. Buffer memory 9 will provide the above image to meter controller 52.

Meter routines 53 will handle the accounting functions of meter 50. Routines 53 are not being described, because one skilled in the art is aware of their operation and function. Clock calendar non-volatile memory registers and battery 56 will transmit the date and time to controllers 52.

Modem 54 may communicate with meter data upload data center 72 during a refill of postage meter 50 by exchanging funds. User 70 of dual meter 49 communicates with I/O ports keyboard display 8. Postal scale 71 is coupled to I/O ports keyboards display 48 and is used to determine the weight of mail 11. Content categorization of goods of content data center 78 is coupled to mail entry office 18. Office 18 receives mail that has been processed by dual meter 49. Mail flows from office 18 to destination delivery office 85 (currently the USPS has approximately 35,000 mail entry and destination offices). Meter data upload data center 72 is coupled to content categorization of content data center 78, and data center 78 is coupled to mail entry office 18. I/O routines 7 will control the interfacing of various components so that content categorization of goods will be sent to data center 78 soon after the contents of mail piece 11 are written in tag 15. The images and data fields of indicia 14 will be transmitted from compose and print indicia 65 to meter indicia print module 73.

Radio frequency identification tag read/writer 51 will begin to function when controller 52 enters the last tag identification value in buffer 57 and current tag read buffer 59 receives the information that module 76 read from the tag 15 portion of label 17 (FIG. 1). Comparator 58 will compare the last tag identification value stored in buffer 57 with the value read by module 76. If comparator 58 determines that the above values are the some, then tag 15 is being used a second time for adjustment purposes, i.e., corrected information is going to be recorded into tag 15.

Radio frequency identification read buffer 60 is a non-volatile memory that is used to store the information that is read from tag 15 in case of a power failure, and radio frequency identification encode/decode routines 61 are used to decode the information read from tag 15 and encode data that is going to be recorded in tag 15. Radio frequency identification read, erase and record routine 2 are used to read, erase and record information into tag 15.

Current carrier contents list nonvolatile memory 139 contains the current categories of goods databases that identify the contents of goods that may be placed in mail 11. The databases were downloaded from data center 78 via data center 72, and a database for a particular pistol will be described in the description of FIG. 6. Issued tag data registers nonvolatile memory 140 stores the information recorded in tag 15, which is uploaded to data center 78 via data center 72.

Tape and feed module 48 contains a stack of labels 105 that include tag 15. Label 17 is transported past radio frequency identification read module 76. Module 76 is positioned in a manner that it will be able to read the information recorded in tags 15 so that module 76 will be able to determine whether or not information has been previously recorded into tag 15. Then label 17 will be transported to module 77 where information will be read, erased and recorded on tag 15. Then label 17 will be transported to paper tape attach module 49. After information is recorded or rerecorded on tag 15, label 17 will be positioned adjacent module 73 so that indicia 14 may be printed on label 17. Module 49 will affix label 17 to mail 11 (FIG. 1).

Figure 3:
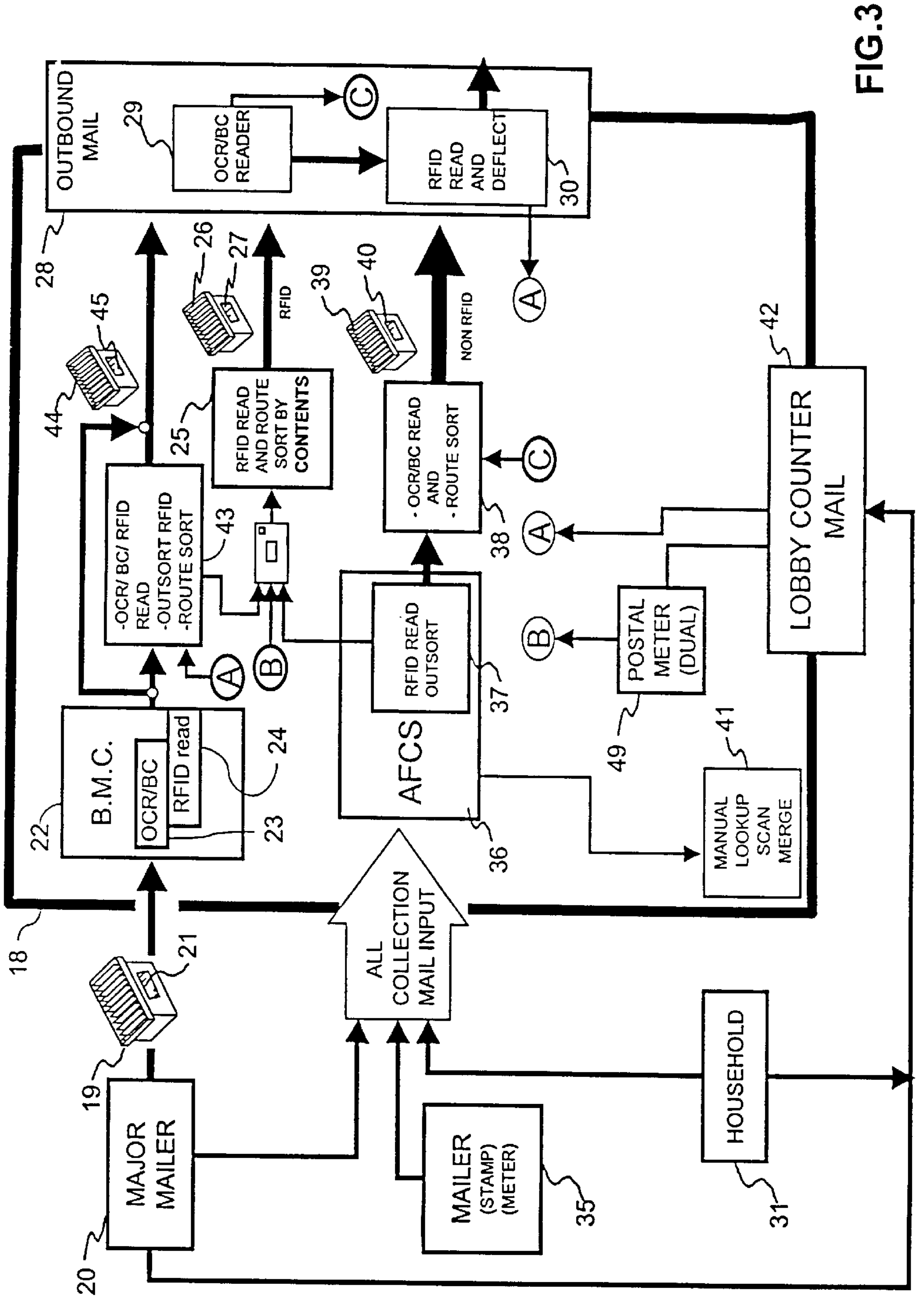
FIG. 3 is a drawing showing how mail is received and processed in the mail entry office of a carrier.

FIG. 3 is a drawing showing how mail is received and processed in the mail entry office of a carrier. Letter mail that is deposited in tray 19 by major mailer 20 contains a bar code 21 on the outside of tray 19. Bar code 21 indicates the destination of tray 19. Tray 19 is delivered to bulk mail center 22 of office 18. Optical character/bar code reader 23 reads the information contained in bar code 21, and radio frequency identification reader 24 reads the information contained in tag 15 (FIG. 1). Tray 19 may contain special service mail with tags 15 or mail in certain specified categories that are identified in tags 15 or normal mail.

Optical reader/radio frequency identification reader and sorter 43 will place mail that does not contain a tag 15 in a tray 44 that has optical/RFID tag 45 that is going to the same destination office as tray 44. Tray 44 will pass through outbound exit 28 of entry office 18 as the delivery process of tray 44 proceeds. Outbound exit 28 contains optical readers and bar code readers 29 that read the optical portion of tag 45, and radio frequency identification readers deflectors 30 that read the RFID portion of tag 45 and any tag 15 that may be present. If mail containing a tag 15 is detected in tray 44, that mail is sent back to the input of sorter 43 to re-tray the mail. Optical reader/radio frequency identification reader and sorter 43 will input mail that contains a tag 15 in radio frequency identification read and route sort by contents 25.

Radio frequency identification (RFID) read and route sorter 25 may use the model SL EV900 reader manufactured by Philips Semiconductors of 1109 McKay Drive, San Jose, Calif. 95131. Sorter 25f will read tag 15 and place the same content mail in a tray 26 that has an optical/RFID tag 27 on the outside of tray 26. Optical/RFID tag 27 indicates the destination office of tray 26 and the content type of the mail in tray 26. Only mail that has a tag 15 affixed thereto that indicates mail of specified contents, i.e., film, guns drugs, chemicals, food, biological materials, etc., and a destination office is contained in tray 26. Depending on the contents of the mail in tray 26, tray 26 may be a specialized tray or container. For instance, tray 26 may be insulated, refrigerated, lead-lined, pressurized, lined to holed caustic materials, etc., to safely carry the mail contained in tray 216. Tray 26 contains mail with tags 15 affixed thereto that will pass through outbound exit 28 of mail entry office 18 as the delivery process of tray 26 proceeds. Outbound exit 28 contains optical readers 29 that read the visual part of tag 27, and radio frequency identification readers 30 that read the RFID portion of tags 27 and tags 15. If mail containing a tag 15 that does not have the same contents specified in tag 27 and does not go to the destination indicated by tag 27, that mail is sent back to the input of sorter 43 so that it may be re-trayed or rerouted.

Collection letter mail may be metered letter mail that is produced at a mailer site 35 that is able to place postal indicia 14 and tag 15 on mail 11 with dual meter 49. Collection mail may also be mail that is received from a household 31. Collection letter mail is sent to advanced facer canceller (hereinafter "AFCS") 36. AFCS 36 contains a radio frequency identification outsort reader 37 that reads tags 15.

AFCS 36 faces the letter mail, and then AFCS 36 electronically identifies and separates prebarcoded mail, handwritten addresses, and machine-imprinted address pieces for faster processing through automation. Letter mail that AFCS 36 determines is optical character readable is sent to OCR read and sort 38. Read and sort 38 reads the entire address on the mail; sprays a bar code on the mail if needed; and then sorts the mail. The mail is then placed in tray 39 that has a bar code 40 on the outside of tray 39. Bar code 40 indicates the destination of tray 39 and other information about the contents of tray 39. Only mail that does not have a tag 15 affixed thereto should be contained in tray 39. Tray 39 will pass through outbound exit 28 of entry office 18 as the delivery process of tray 39 proceeds. Outbound exit 28 contains optical readers 29 that read bar code 40, and radio frequency identification readers 30 that read any tag 15 that may be present. If mail containing a tag 15 not for the destination office is detected in tray 39, that mail is sent back to the input of sorter 38 so that it may be placed in a tray that is going to the correct destination office. Letter mail that AFCS 36 determines is not optical character readable is sent to manual look up scan and merge 41 where the mail is manually processed. Radio frequency identification reader 37 reads tags 15 and sends the mail containing a tag 15 to RFID/sorter 25.

Mail that is produced at household 31 and other mail may be brought directly to the carrier at lobby counter 42. The mailer will pay the carrier the necessary amount to deliver the mail in accordance with the delivery service requested and the contents of mail 11. Dual meter 49 will print postal indicia 14 a nd radio frequency identification tag 15 on label 17. Mail containing a label 17 with a tag 15 will be sent to RFID read and route sort by contents 25. Special service mail will be sent to the input of RFID/sorter 25.

Figure 4:
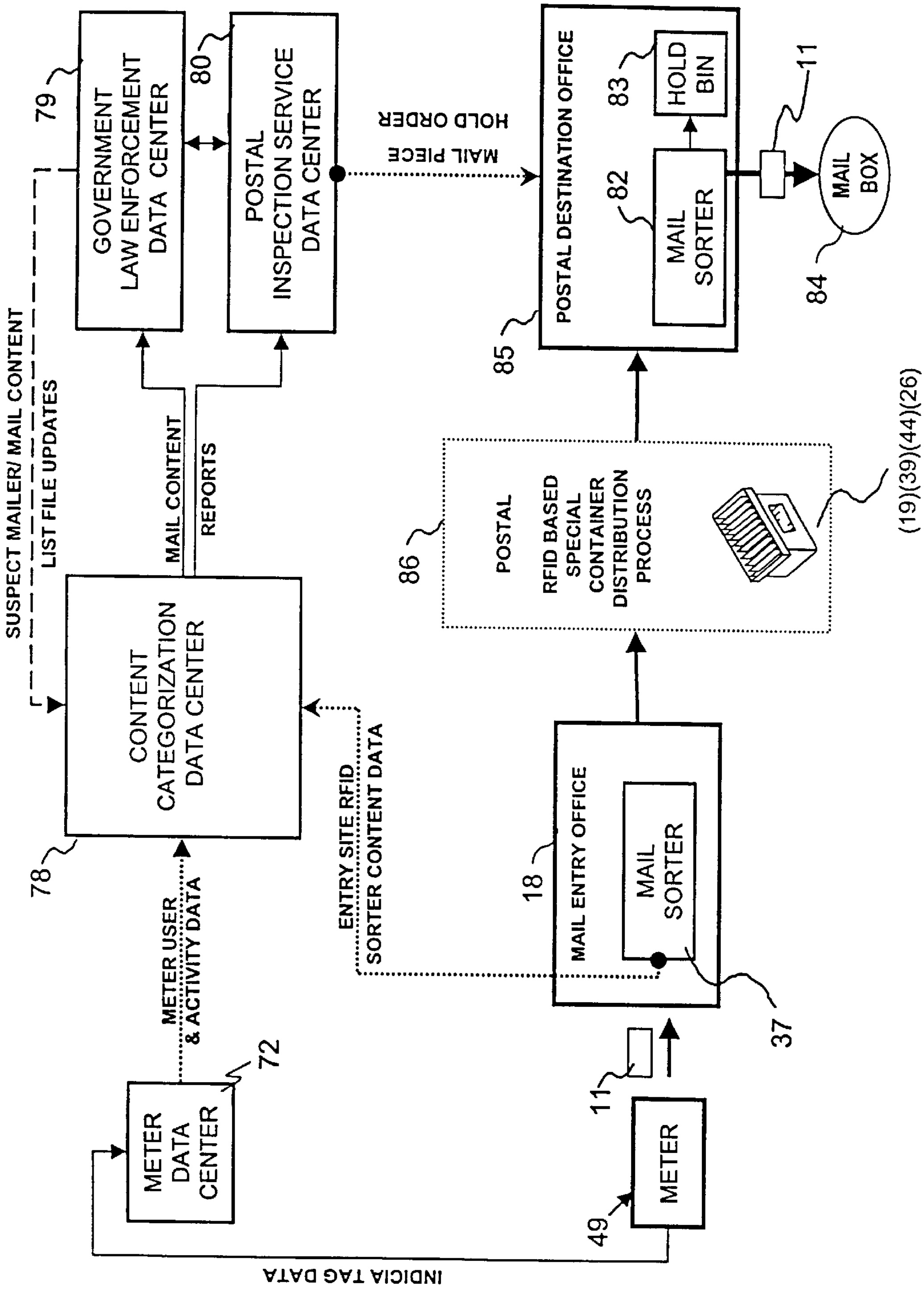
FIG. 4 is a drawing showing how mail is processed from the mail entry office of a carrier to a recipient and how data is captured and distributed.

FIG. 4 is a drawing showing how mail is processed from mail entry office 18 of a carrier to a recipient and how data is captured and distributed. Mail 11 that is produced by dual meter 49 enters mail entry office 18 where it is sorted by RFID read outsort 37. The contents data obtained from reading tag 15 is transmitted to content categorization data center 78. RFID read and route source by contents sorts and routes mail to postal RFID based special container distribution process 86 where mail containing certain materials or goods that require special treatment, i.e., radioactive material chemical compounds; poisons; carcinogenic materials; caustic chemicals; drugs; biological materials; viruses; vaccines; DNA; blood samples; food; plants; photosensitive materials; thermo-sensitive materials; etc., will be placed in special mail containers or trays. The special mail containers or trays may be pressurized, refrigerated, lead-lined, etc. Mail that does not require the use of special trays or containers will be placed in normal trays.

Meter 49 transmits information regarding the data in label 17, i.e., the data contained in indicia 14 and tag 14 (FIG. 1) to meter data center 72. Data center 72 informs content categorization data center 78 of the identity of meter 49, of the goods placed in mail 11, and the identity of the recipient of mail 49 as well as the activity of dual meter 11. Data center 78 will be more fully described in the description of FIG. 5. Government law enforcement data center 79 is coupled to data center 78, Data center 79 transmits the current categories of goods databases that identify the contents of goods that may be placed in mail 11. An example of a particular identification table for a colt government model 45 caliber pistol is described in FIG. 6. Data center 79 also informs data center 78 of the items in the identification tables in which it wants data center 78 to monitor. Postal inspection service data center 80 is coupled to data centers 78 and 79. Data center 78 prepares reports that indicate the items which data center 79 wants to monitor. The reports indicate the monitored item, the licensee of dual meter 49, the sender's name and address, the recipient's name and address, and the date of mailing. An entry in the report will be made for each monitored item that is being sent to a particular recipient.

Normal trays and special mail containers will be delivered to postal destination office 85. Data centers 79 and 80 may inform postal destination office 85 of the mail 11 that they want held in hod bin 83. Data centers 79 and 80 may investigate and/or arrest people who are receiving or sending items that may be used for illegal purposes. Mail sorter 82 sorts the mail to allow mail 11 if it does not contain illegal items to be delivered to mail box 84.

Figure 5:
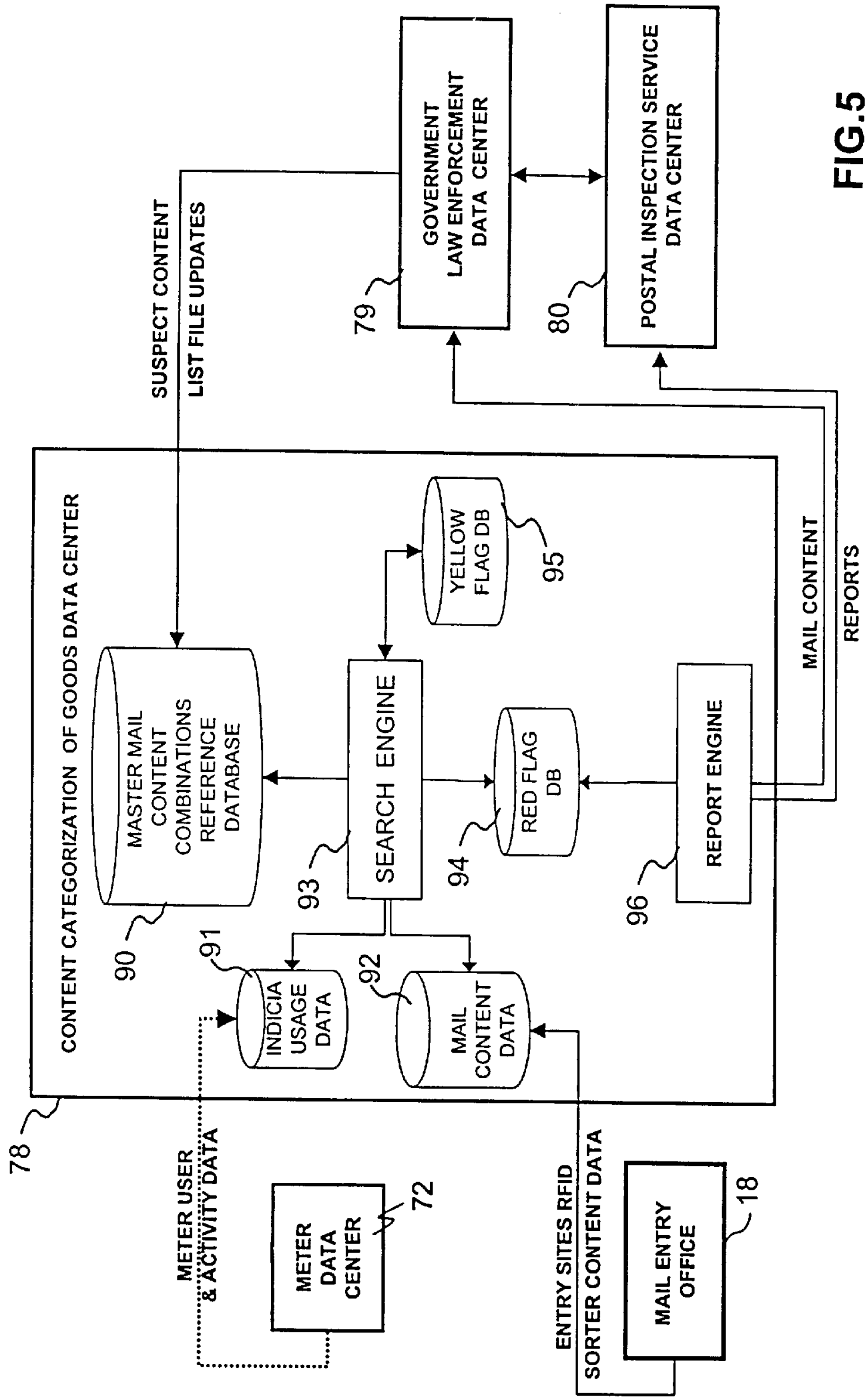
FIG. 5 is a drawing of content categorization of goods data center 78.

FIG. 5 is a drawing of content categorization of goods data center 78. Data center 78 includes master mail content combinations reference database 90, which is coupled to data center 79, search engine 93 which is coupled to data base 90, yellow flag database 95 which is coupled to search engine 93, red flag database 94 which is coupled to search engine 93, indicia usage database 91 which is coupled to search engine 93 and meter upload data center 72, mail content database 92 which is coupled to database 91, search engine 93 and mail entry office 18, and report engine 96 which is coupled to red flag database 94, data center 79 and data center 80.

Master mail content combinations reference database 90 contains a description of all of the goods and components that make up the goods that the government wants to monitor. For instance, for each good that the government is monitoring, the government will prepare a database similar to the database described in FIG. 6, i.e., a Colt 45 parts list. Thus, there may be tables for all illegal and harmful goods. Data center 79 uploads to database 90 the information the government wants to monitor. Indicia usage database 91 receives the identity of dual meter 49, the contents of the goods placed in mail 11, and the identity of the recipient of mail 11 as well as the activity of dual meter 49 from data center 72. Mail content database 92 receives the information read from tag 15 (FIG. 1) from mail entry office 18. When search engine 93 is activated, search engine 93 reads databases 91 and 92 for mail 11 and examines database 90 for matches, i.e., the content of mail 11 includes items the government is monitoring. If search engine 93 finds an item or component of a good that the government is monitoring and the government does not think it is hazardous or illegal unless it is combined with other items, that item and the relevant information obtained from mail 11 will be placed in yellow flag database 95. Yellow flag database 95 is reread by search engine 93 for each mail 11 to look for new hazardous or illegal combinations. If search engine 93 finds a good or an item or component of a good that the government is monitoring and the government thinks it is hazardous or illegal or suspicious, then that item and the relevant information obtained from mail 11 will be placed in red flag database 94. Red flag database 94 sends the information in database 94 to reports engine 96. Reports engine 96 sends reports to data centers 79 and 80. The aforementioned reports may contain information regarding who sent, and who received, any hazardous, illegal, or suspicious items.

FIG. 6 is a data vase of the component parts of a 45 caliber Colt Government Model Pistol. Database 990 contains a parts list, part numbers and description of all of the items that are needed to make a 45 caliber Colt Government Model Pistol.

The government may be interested in monitoring the obtaining or selling of specific items or combinations of specific items contained in database 990. For instance, if mail 11 (FIG. 1) contained item 34, a receiver, the government may want that fact entered into red flag database 94 (FIG. 5) so that data centers 79 and 80 may receive the information and determine if an investigation is warranted. If mail 11 contained item 6, an ejector, and item 18, a magazine assembly, or if one of the above items was previously sent to the same recipient, the government may want the foregoing information entered into red flag database 94 (FIG. 5). If mail 11 contained only item 6, an ejector, or only item 18, a magazine assembly, the government may want the above information entered into yellow flag database 95 (FIG. 5). Thus, when any item listed in database 990 is in mail 11, a description of that item and any relevant information concerning that item will be placed in yellow flag database 95. However, if the item listed in database 990 is deemed to be important by itself and that item is contained in mail 11, then a description of that item and any relevant information concerning that item will be placed in red flag database 94. However, if an item listed in database 990 is contained in mail 11 and previous items in database 990 have been received by the same recipient or specified groups of recipients, the government may consider the combination of these items hazardous, illegal or suspicious. Thus, the foregoing will be recorded in red flag database 94.

It would be obvious to one skilled in the art that different databases similar to database 990 may be constructed for all types of goods, chemicals, biologicals etc., that the government wishes to monitor.

The above specification describes a new and improved method for indicating the contents of mail. It is realized that the above description may indicate to those skilled in the art ways in which the principles of this invention may be used without departing from the spirit. Therefore, it is intended that invention be limited only by the scope of the appended claims.

What is claimed is:

1. A method for indicating the contents of mail, said method comprises the steps of:

A. preparing a label that includes a tag portion and a postal indicia portion;

B. recording the contents of mail and the name of the recipient in the tag portion;

C. affixing the label to an exterior face of mail;

D. reading the tag to enable the entity reading the tag to know the contents of the mail;

E. sorting the mail so that like types of content mail will be placed in the same type of mail container; and F. accumulating the information read from the tag to determine if the goods being monitored are addressed to specific recipients.

2. The method claimed in claim 1, wherein the tag is a radio frequency identification tag.

3. The method claimed in claim 1, further including the step of:

recording information regarding the mailer of mail in the tag.

4. The method claimed in claim 1, wherein the container is pressurized.

5. The method claimed in claim 1, wherein the container is refrigerated.

6. The method claimed in claim 1, wherein the container is lead lined.

7. The method claimed in claim 1, further including the step of:

preparing a list of goods that may be contained in mail.

8. The method claimed in claim 1, further including the step of:

identifying items in the list of goods that are going to be monitored.

9. The method claimed in claim 1, further including the step of:

determining if the goods sent to a specific recipient indicate that the recipient is receiving goods that may be harmful.

10. The method claimed in claim 1, further including the step of.

determining if the goods sent to a specific recipient indicate that the recipient is receiving goods that may be illegal.

11. The method claimed in claim 1, further including the step of:

determining if the goods sent to a specific recipient indicate that the recipient is receiving goods that may be suspicious.

12. The method claimed in claim 1, further including the step of:

determining if the goods sent to a specific recipient indicate that the recipient is receiving goods that may be combined with other goods to form illegal goods.

13. The method claimed in claim 1, further including the step of:

determining if the goods sent to a specific recipient indicate that the recipient is receiving goods that may be combined with other goods to form harmful goods.

14. The method claimed in claim 1, further including the step of:

determining if the goods sent to a specific recipient indicate that the recipient should be investigated because the recipient may be receiving goods that may be combined with other goods to form goods that are suspicious.

15. The method claimed in claim 14, further including the step of:

preparing a report indicating information regarding the goods sent to recipients.

16. The method claimed in claim 14, further including the step of:

notifying the authorities of recipients who are being sent suspicious goods.

17. The method claimed in claim 14, further including the step of:

holding goods sent to recipients that may be suspicious goods.

* * * * *